United States Patent
Newton et al.

(10) Patent No.: US 10,080,010 B2
(45) Date of Patent: *Sep. 18, 2018

(54) METHOD OF ENCODING A VIDEO DATA SIGNAL FOR USE WITH A MULTI-VIEW RENDERING DEVICE

(71) Applicant: KONINKLIJKE PHILIPS N.V., Eindhoven (NL)

(72) Inventors: Philip Steven Newton, Eindhoven (NL); Wiebe De Haan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,932

(22) Filed: Oct. 10, 2017

(65) Prior Publication Data

US 2018/0035095 A1   Feb. 1, 2018

Related U.S. Application Data

(63) Continuation of application No. 14/889,902, filed as application No. PCT/IB2014/061094 on Apr. 30, 2014, now Pat. No. 9,826,212.

(Continued)

(51) Int. Cl.
*H04N 7/14* (2006.01)
*H04N 13/00* (2018.01)
(Continued)

(52) U.S. Cl.
CPC ....... *H04N 13/161* (2018.05); *H04N 13/0048* (2013.01); *H04N 13/0066* (2013.01);
(Continued)

(58) Field of Classification Search
CPC .... H04N 19/17; H04N 19/179; H04N 19/186; H04N 19/46; H04N 13/0048;
(Continued)

(56) References Cited

U.S. PATENT DOCUMENTS 8,717,405 B2   5/2014   Li
9,031,343 B2 *  5/2015   Venkataraman .......... G06T 9/00
                                                       382/250

(Continued)

FOREIGN PATENT DOCUMENTS

EP    2320667 A1    5/2011
WO    2006137000 A1   12/2006
(Continued)

OTHER PUBLICATIONS

High Definition Multimedia Interface Specification Version 1.4a Extraction of 3D Signaling Portion. 2010.
(Continued)

*Primary Examiner* — Robert Chevalier (57) ABSTRACT

The present invention relates to a method of encoding a video data signal for use with a multi-view rendering device, a method of decoding the video data signal, the video data signal, an encoder of the video data signal, a decoder of the video data signal, a computer program product comprising instructions for encoding the video data signal and a computer program product comprising instructions for decoding a video data signal. The method of encoding provides (401) a first image (10) of a scene associated with a first viewpoint, a depth map (20) associated with the first image, metadata (30) for use in depth map processing or rendering one or more views for further viewpoints by the multi-view rendering device, and generates (404) the video data signal. The video data signal comprises video frames partitioned in sub-images comprising a sub-image based on the first image (Continued)

and a depth sub-image based on the depth map, and metadata encoded in a color component of the depth sub-image.

26 Claims, 4 Drawing Sheets

Related U.S. Application Data (60) Provisional application No. 61/821,754, filed on May 10, 2013.

(51) Int. Cl.
| | |
|---|---|
| *H04N 13/161* | (2018.01) |
| *H04N 21/218* | (2011.01) |
| *H04N 21/84* | (2011.01) |
| *H04N 21/236* | (2011.01) |
| *H04N 19/46* | (2014.01) |
| *H04N 19/186* | (2014.01) |
| *H04N 19/179* | (2014.01) |
| *H04N 19/17* | (2014.01) |
| *H04N 13/178* | (2018.01) |

(52) U.S. Cl.
CPC ........... *H04N 13/178* (2018.05); *H04N 19/17* (2014.11); *H04N 19/179* (2014.11); *H04N 19/186* (2014.11); *H04N 19/46* (2014.11); *H04N 21/21805* (2013.01); *H04N 21/23614* (2013.01); *H04N 21/84* (2013.01)

(58) Field of Classification Search
CPC ......... H04N 13/0066; H04N 21/23614; H04N 21/84; H04N 21/21805
USPC ........ 348/43, 42, 46, 47, 51, 14.13; 386/328
See application file for complete search history.

(56) References Cited

U.S. PATENT DOCUMENTS

| | | |
|---|---|---|
| 9,299,195 B2 | 3/2016 | Dou |
| 2009/0015662 A1 | 1/2009 | Kim |
| 2010/0158351 A1 | 6/2010 | De Jong |
| 2011/0023066 A1 | 1/2011 | Jang |
| 2011/0211634 A1 | 9/2011 | Goedeken |

FOREIGN PATENT DOCUMENTS

| | | |
|---|---|---|
| WO | 2010041176 A1 | 4/2010 |
| WO | 2010070545 A1 | 6/2010 |
| WO | 2011039679 A1 | 4/2011 |
| WO | 20120147010 A1 | 11/2012 |
| WO | 2013188552 A2 | 12/2013 |

OTHER PUBLICATIONS

Minoli, Daniel 3DTV Content Capture, Encoding and Transmission: Building the Transport Infrastructure for Commercial Services, 2010, Abstract Only.

* cited by examiner

Mode A​​​​​​​​​​​​​​​​​​​​Mode B

2D + depth formats over HDMI

FIG. 1

Mode C​​​​​​​​​​​​​​​​​​​​Mode D

Stereo + depth formats over HDMI

FIG. 5C

METHOD OF ENCODING A VIDEO DATA SIGNAL FOR USE WITH A MULTI-VIEW RENDERING DEVICE

CROSS-REFERENCE TO PRIOR APPLICATIONS

This application a continuation of U.S. patent application Ser. No. 14/889,902, filed on Nov. 9, 2015, which is the U.S. National Phase application, under 35 U.S.C. § 371 of International Application No. PCT/IB2014/061094, filed on Apr. 30, 2014, which claims the benefit of U.S. Patent Application No. 61/821,754, filed on May 10, 2013. These applications are hereby incorporated by reference herein.

FIELD OF THE INVENTION

The present invention relates to a method of encoding a video data signal for use with a multi-view rendering device a method of decoding a video data signal, a video data signal, an encoder of a video data signal for use with a multi-view rendering device, a decoder of a video data signal, a computer program product comprising instructions for encoding a video data signal and a computer program product comprising instructions for decoding a video data signal.

BACKGROUND OF THE INVENTION

Over the last two decades three-dimensional display technology has matured. Three-dimensional (3D) display devices add a third dimension (depth) to the viewing experience by providing each of the viewer's eyes with different views of the scene that is being watched.

As a result we now have various ways to view three-dimensional image/video signals. On the one hand we have glasses based three-dimensional display system where a user is presented with distinct images for her/his left eye and right eye. On the other hand we have auto-stereoscopic three-dimensional display systems that provide the un-aided eye of a viewer with a three-dimensional view of a scene.

In glasses-based system the active/passive glasses provide a filter for separating the distinct images as presented on the screen for the respective eye of the viewer. In glasses-free or auto-stereoscopic systems the devices quite often are multi-view displays that use light directing means, e.g. in the form of a barrier or lenticular, to direct a left image to the left eye and a right image to the right eye In order to provide content for use with stereoscopic multi-view display devices, various input formats have been designed over time, in particular also for device interfaces, between content delivery devices such as set-top boxes, Blu-ray players on the one hand and display/rendering devices such as televisions on the other hand.

Over time a variety of formats has been defined for the transfer of video data over device interfaces, such as HDMI, DVI or DisplayPort. With the introduction of stereoscopic image rendering and auto-stereoscopic displays a further need appeared for providing content for use in stereoscopic image rendering. One such format is the disclosed in PCT application WO2006/137000(A1), which relates to a format that describes how image and depth information, and optionally occlusion image and occlusion depth may be transferred in a matrix form over an existing device interface such as HDMI. The general idea behind this approach was to re-use the existing standardized device interface in order to deliver content to new auto-stereoscopic display devices.

More recently the HDMI device interface format has been adapted to also handle video data for use in stereoscopic image generation as is disclosed in the document "High-Definition Multimedia Interface Specification Version 1.4a Extraction of 3D Signaling Portion", which is available for download from the HDMI web-site using the following link: http://www.hdmi.org/manufacturer/specification.aspx.

OBJECT OF THE INVENTION

The inventors have observed that the existing audio/video interface formats like HDMI only have limited support for formats for image based rendering that require image and depth information. For instance, in HDMI 1.4b there is only basic support for transferring a left image and an associated depth map. Accordingly there appears to be room for further improvement.

SUMMARY OF THE INVENTION

The inventors realized that for one it would be advantageous to add further formats that for example also provide support for the transmission of stereo images and associated depth information. Moreover as will be discussed later in more detail, it would further be beneficial to also provide more elaborate support for the transmission of supplemental information (like SEI) from the source device to the sink device.

According to a first aspect of the invention there is provided a method of encoding a video data signal for use with a multi-view rendering device according to claim 1.

Optionally the video signal may have two (or more) sub-images based on respective images (for example called a first image and a second mage) with respective viewpoints, e.g. a left viewpoint and a right viewpoint. One or both of these sub-images may have respective depth sub-images. The metadata may be encoded in one or both respective depth sub-images. Optionally, where the claims define that the metadata is encoded in a color component, the metadata may be encoded in two or more color components.

Preferably the information from the depth map is encoded in the luminance values of the one or two further sub-images and the information from the metadata is encoded in the chrominance values of the one or two further sub-images resulting in a backwards compatible manner of transporting the video data signal.

Preferably the information comprised in the video data signal comprises a substantially uncompressed two-dimensional array of data.

Preferably the method further comprises transmitting the video data signal over an interface using one or more bit-serial data lines to the multi-view rendering device.

Preferably the metadata is inserted in the video data signal for every field, for every frame, for every group of pictures, and/or for every scene.

Preferably the metadata is provided with a checksum, the metadata will be used by either the depth map processing or the view rendering at the decoder side. The impact of errors in the metadata can be significant. In a data interface that transfers uncompressed image data such as RGB pixels, an error in a pixel value will not result in excessive perceptive errors. However an error in metadata may result in the rendered views for a frame being computed based on the wrong depth information and/or using the wrong rendering settings. The impact of this can be quite significant and as a result the detection of such error is required and the use of redundancy and/or an error correcting code is preferred.

Preferably the metadata comprises freshness information indicating whether the metadata being provided is new, so as to help create a more efficient control process for handling the metadata processing at the decoding side.

Preferably the metadata comprises information indicating whether the metadata has changed since the previous frame. This furthermore allows the control process to become more efficient in that settings that did not change (even though they were transmitted) need not be refreshed/updated.

Preferably the method further comprises handling encoding and transferring stereo video data with stereo depth information.

According to a second aspect of the invention there is provided a video data signal, the video data signal (50) for use with a multi-view rendering device as claimed in claim 10.

According to a third aspect of the invention there is provided a data carrier, comprising the video data signal of any one of claim 10 or 11 in a non-transitory form. This data carrier may be in the form of a storage device such as a hard disk drive or a solid state drive, or a data carrier in the form of an optical disc.

According to a fourth aspect of the invention there is provided a method of decoding a video data signal for use with a multi-view rendering device according to claim 13.

According to a fifth aspect of the invention there is provided a decoder for decoding a video data signal for use with a multi-view rendering device according to claim 15.

According to a sixth aspect of the invention there is provided a computer program product comprising instructions for causing a processor system to perform the method according to any one of claims 1-9.

According to a seventh aspect of the invention there is provided a computer program product comprising instructions for causing a processor system to perform the method according to any one of claims 13-14.

According to an eight aspect of the invention there is provided an encoder of a video data signal for use with a multi-view rendering device according to claim 22.

These and other aspects of the invention are apparent from and will be elucidated with reference to the embodiments described hereinafter.

It should be noted that items which have the same reference numbers in different figures, have the same structural features and the same functions, or are the same signals. Where the function and/or structure of such an item has been explained, there is no necessity for repeated explanation thereof in the detailed description.

DETAILED DESCRIPTION OF THE INVENTION

The inventors observed that video and associated depth information, intended for multi-view 3D presentation, can be transmitted to auto-stereoscopic displays using standard interconnection/device interface formats, like HDMI, DVI and/or DisplayPort by partitioning the available video frames into sub-images for video and depth.

As the image information that is typically used on device interfaces is designed to be able to carry at least 8-bit samples of R, G and B information, i.e. 24 bits per pixel, and the depth associated with a pixel typically does not require the full 24 bits per pixel, the transmission bandwidth in the sub-images is not optimally used.

For this reason the inventors prefer to transmit the depth information in the sub-images in such a manner that the depth information is encoded in the luminance samples of these sub-images, so that metadata that is intended to enhance and/or guide the view generation process can be stored in the chrominance samples of the depth sub-images. [That is in the image information where the depth sub image is stored.]

The invention applies to auto-stereoscopic display that receive the video and depth input signals from an HDMI (or similar) device interface. The invention equally applies to media players, set-top boxes, handheld/mobile devices, tablets, pc's, etc. with an HDMI, DVI, DisplayPort or other device interface and that provide support for a video and depth based 3D format.

HDMI is the leading device interface format used to transmit video and audio from content sources (media players, set-top boxes and other content sources) to sink devices (displays, TVs, AV receivers). The HDMI standard was originally defined to support video resolutions up to Full HD resolution (1920×1080 and 2048×1080), has already limited support for 2160p (also known as 4K) resolutions, such as 3840×2160 and 4096×2160 and is expected to have wider support for the 4K formats in a future revision of the standard.

The latest available HDMI Specification is Version 1.4b. Notably version 1.4a already supports the transmission of stereoscopic video content in the form of 2-view stereo; i.e. using left and right images of a stereo pair. Moreover there is an option to transmit a left image and associated depth, also known as 2D+depth or image+depth.

In addition to video and audio, HDMI can transmit a limited amount of standardized control and configuration data by means of so-called InfoFrames. Notably there are alternative video (device) interfaces such as DVI and DisplayPort, which are mainly used by personal computers.

For multi-view three-dimensional (3D) image rendering, devices preferably receive one or more views with associated depth information and metadata.

Various compression formats for video and depth are currently under development, amongst others by ITU-T (VCEG) and ISO/IEC (MPEG). These compression formats also support inclusion of supplemental enhancement information (SEI) that is not needed for the decoding process, but can be beneficial for the best possible presentation of the decoded images.

However, contrary to the situation with conventional video, it is foreseen that in particular for auto-stereoscopic display devices, part of the image based rendering will be conducted by the auto-stereoscopic display device in order to be able to support various proprietary display device implementations. As a result contrary to the situation in conventional 2D video, there is a greater need for transmitting rendering related metadata to the auto-stereoscopic display devices. In particularly as SEI elements in a compressed stream are foreseen that may contain information to improve the rendering process at the auto-stereoscopic display device.

The present invention solves the problems mentioned by utilizing 2160p video samples to transmit up to two Full HD video views with corresponding depth and supplemental information (metadata). To achieve this goal, the 2160p video frames are subdivided into 4 quadrants (sub-images), each containing one of the four components: Left view video frame (L), Right view video frame (R), depth for L and depth for R. In the depth sub-images only the luminance components are used for depth. The chrominance components are used for the supplemental information.

In short the prior art solutions typically provide poor support for image based rendering; i.e. more particularly there appears insufficient support for more advanced/elaborate depth map data and there appears to be a general lack in providing metadata for enhancing/improving the view rendering process.

This invention relates to interconnection formats for transmitting video, depth and metadata, e.g. between stand-alone media players (including broadcast receivers/decoders and mobile devices) and display devices; i.e. device interfaces. One example of such an interconnection format is HDMI. Other examples are DVI and DisplayPort. The invention also relates to video interconnection within a device, e.g. between sub-components over twisted pair (LVDS).

Depending on the source content, the interconnection format may contain either a single view video component with an associated depth or disparity map (2D+depth), or two video views with one or two additional depth components (stereo+depth).

As will be clear to those skilled in the art, depth is roughly inversely proportional to disparity, however the actual mapping of depth to disparity in display devices is subject to various design choices such as, the total amount of disparity that may be generated by the display, the choice of allocating a particular depth value to zero disparity, the amount of crossed disparity allowed, etc. However, the depth data which is provided with the input data is used to warp images in a depth dependent manner. Therefore disparity data is here qualitatively interpreted as depth data.

As indicated above for 2D+depth there was already an optional format defined for progressive video in HDMI 1.4b (and 1.4a, partially available for download from www.hdmi.org). Stereo+depth cannot be transmitted in HDMI 1.4b because of limitations in the number of pixels that can be transmitted per second. For this, a higher speed is needed, as is expected to become available in a future revision of HDMI, referred to in the following as HDMI 2.0.

If 2D+depth is transmitted over the interface, texture and depth belong to the same (L or R) view. In the stereo case, the two texture views have a fixed association with a left eye view (L) and a right eye view (R). In that case the two depth views have a fixed relation with the two texture views. If in the stereo case one of the two depth views is not present in the coded bitstream, the related depth in the HDMI format is set to all zeros and appropriate signaling is included in the supplemental information (metadata). As indicated above, this metadata is included in the color components of the depth pixels.

An optional 2D+depth format was already defined in Annex H of the HDMI 1.4a specification. Sink devices may indicate support for that format through the HDMI VSDB in the EDID information. For 2D+depth (or "L+depth") the 3D_Structure_ALL_4 bit shall be set to 1. See table H-7 of "High-Definition Multimedia Interface Specification Version 1.4a Extraction of 3D Signaling Portion". The signaling from the source to the sink shall be done through a HDMI Vendor Specific InfoFrame by setting the 3D_Structure field to 0100 (L+depth) according to table H-2. This option is only available for progressive video, preferably with VIC codes 16 (1080p60) or 31 (1080p50).

Note that, although HDMI refers to this format as L+depth, the 2D video component may be associated to either the left or the right view, depending on the information included in the metadata. On top of what has been defined in HDMI 1.4b, metadata shall be included in the color components of the depth pixels to signal the specific format used to transmit video+depth and supplemental information.

HDMI 2.0 supports higher pixel clock frequencies than HDMI 1.4b and includes support for 2160p formats (3840×2160 and 4096×2160 resolution) at frame rates up to 60 Hz. The 2D+depth and stereo+depth formats may be packed in 2160p progressive frames to carry the data across the HDMI 2.0 interface.

The 2160p formats may be combined with any of the RGB or $YC_BC_R$ pixel encoding modes defined by HDMI. For higher frame rates the $YC_BC_R$ 4:2:0 pixel encoding mode is the only available option.

The following frame packing configurations (modes) are examples of how the HDMI 2160p formats can be used to transmit video+depth:

A. Progressive 2D+depth
B. Interlaced 2D+depth
C. Progressive stereo+depth
D. Interlaced stereo+depth In any of the modes each active line contains the video (texture) pixels of a single line followed by an equal number of associated depth pixels, together filling up the active line. The mode is indicated in the metadata, which is encoded in the color components of depth pixels, starting from the first depth pixel of the first active line.

Figure 1:
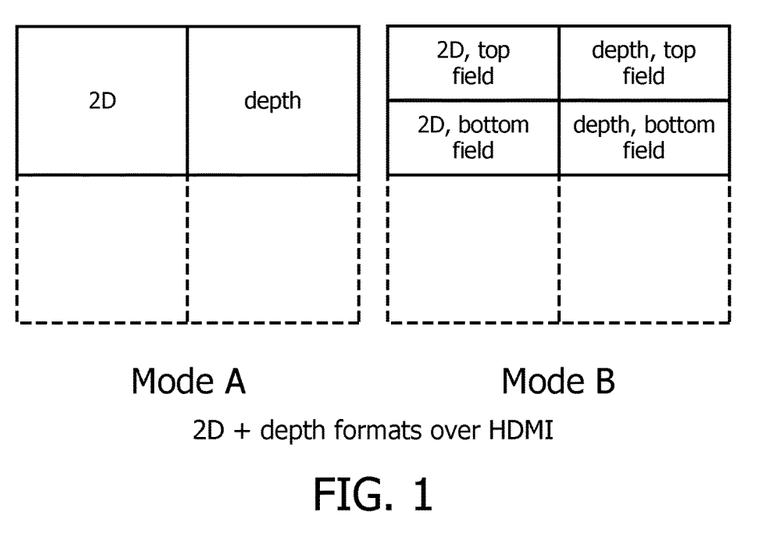
FIG. 1 shows a schematic representation of the transfer of 2D+depth formats over HDMI.
Figure 2:
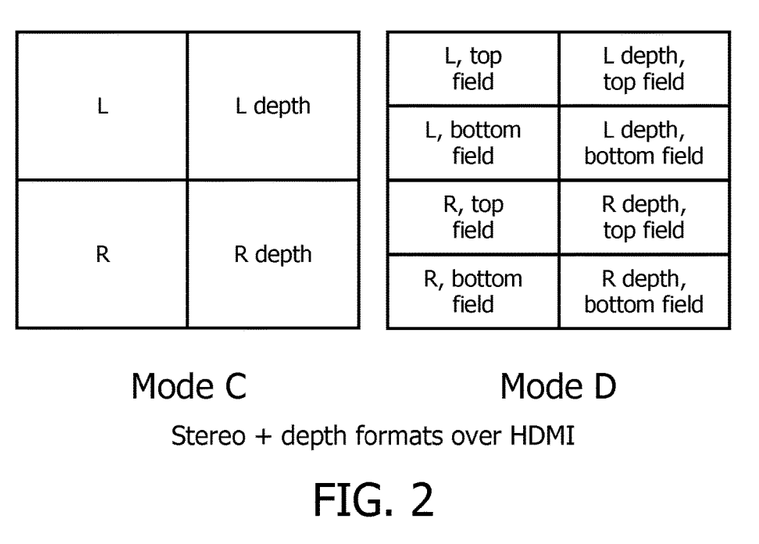
FIG. 2 shows a schematic representation of the transfer of stereo+depth formats over HDMI.

The packing of the texture and depth sub-images within the active HDMI frame for each of the four modes is depicted in FIG. 1 and FIG. 2.

The texture sub-images have a horizontal resolution of half the horizontal resolution of the active line in one of the two 2160p HDMI video formats, i.e. either 1920 or 2048 pixels.

In the progressive modes, the texture sub-images have a vertical resolution of 1080 lines, i.e. half the vertical resolution of the 2160p HDMI video formats.

In the interlaced modes, the texture sub-images have a vertical resolution of 540 lines, i.e. a quarter of the vertical resolution of the 2160p HDMI video formats.

The sampling locations in the case of $YC_BC_R$ 4:2:2 and 4:2:0 pixel encoding are preferably according to the AVC specifications (see section 6.2 of ISO/IEC 14496-10:2012—Information technology—Coding of audio-visual objects—Part 10: Advanced Video Coding). The depth sub-images have a horizontal resolution of either 1920 or 2048 pixels, i.e. half the horizontal resolution of the active line in one of the two 2160p HDMI video formats.

In the progressive modes, the depth sub-images have a vertical resolution of 1080 lines, i.e. half the vertical resolution of the 2160p HDMI video formats.

In the interlaced modes, the depth sub-images have a vertical resolution of 540 lines, i.e. a quarter of the vertical resolution of the 2160p HDMI video formats.

The depth sub-images contain depth values in the range from 0 to 255, inclusive, with a meaning indicated by metadata.

In the case of $YC_BC_R$ pixel encoding, the depth values shall be stored in Y components. The C components shall be set to 0, unless they contain metadata. The sink device shall only rely on the Y component values for depth.

In the case of RGB 4:4:4 pixel encoding, the depth values shall be stored in the R components. The G and B components shall be set to the same value as the R component, unless they contain metadata. The sink device shall only rely on the R component values for depth.

Alternatively, in the case of RGB 4:4:4 pixel encoding, the depth values shall be stored in the G components. The R and B components shall be set to zero value, unless they contain metadata. The sink device shall only rely on the G component values for depth.

In the case that more than 8 bits per component are used (if frame rate and the HDMI TMDS clock allow), the depth values are stored in the most significant bits of the Y components.

The metadata channel contains the format indication of the frame and metadata. This channel comprises a sequence of bytes included in the depth pixels starting from the first depth pixel in the first depth line in each frame, continuing with the depth pixels from the next line for as many lines as needed to convey the data. The metadata channel bytes are stored in the C components of the depth sub-images when in one of the $YC_BC_R$ pixel encoding modes, and stored in the G and B components when in the RGB 4:4:4 pixel encoding mode. In the case that more than 8 bits per component are available (if frame rate and HDMI TMDS clock allow), metadata channel bytes are stored in the 8 most significant bits of the components.

The mapping of metadata bytes to components in the various pixel encoding modes is shown in Table 1 below.

TABLE 1

Mapping of metadata bytes to components

| Header byte | RGB 4:4:4 | $YC_BC_R$ 4:4:4 | $YC_BC_R$ 4:2:2 | $YC_BC_R$ 4:2:0 |
|---|---|---|---|---|
| 1 | G0 | $C_B0$ | $C_B0$ bits 11-4 | $C_B00$ |
| 2 | B0 | $C_R0$ | $C_R0$ bits 11-4 | $C_R00$ |
| 3 | G1 | $C_B1$ | $C_B2$ bits 11-4 | $C_B02$ |
| 4 | B1 | $C_R1$ | $C_R2$ bits 11-4 | $C_R02$ |
| 5 | G2 | $C_B2$ | $C_B4$ bits 11-4 | $C_B04$ |
| 6 | B2 | $C_R2$ | $C_R4$ bits 11-4 | $C_R04$ |
| ... | ... | ... | ... | ... |

Metadata is included in every frame, whether or not there was a change in the metadata content. The advantage of doing so is that it becomes possible to access the metadata on a per frame basis allowing rendering to start when the information for that frame has been transmitted. So the metadata may be inserted repeatedly, whether or not there was a change in the metadata, e.g. for every frame, for every field, for every group of pictures, and/or for every scene.

The metadata channel may be organized as a sequence of packets, as shown in Table 2.

TABLE 2

Metadata channel syntax

| | # bytes |
|---|---|
| metadata_channel_sequence { <br>   while(next_bits( 8 ) >= 0xF0 ) { <br>     metadata_channel_packet( ) <br>   } <br> } | (64) |

The metadata channel packet syntax in turn may be as suggested in table 3.

TABLE 3 metadata channel packet syntax

| | # bytes |
|---|---|
| metadata_channel_packet { <br>   packet_id <br>   packet_subcode <br>   packet_metadata_type <br>   packet_count <br>   packet_payload( ) <br>   packet_edc <br> } | 1 <br> 1 <br> 1 <br> 1 <br> (56) <br> 4 |

The metadata channel contains a sequence of 64-byte metadata channel packets. The number of packets included in the sequence depends on the amount of metadata to be transmitted. To improve robustness, the metadata is transmitted three times. All bytes of the metadata channel following the last metadata channel packet are set to 0. So here the metadata may be inserted repeatedly, although there is no change in the metadata.

Each 64-byte packet is starting with a 4-byte header, followed by a 56-byte payload and a 4-byte error detection code (EDC). The actual metadata is included in the payload fields.

packet_id identifies the content of the packet according to table 4.

TABLE 4 packet_id

| packet_id | Description |
|---|---|
| 0xF0 | Packet containing metadata; not the first packet in a sequence with same packet_metadata_type |
| 0xF1 | First packet containing metadata of a sequence with same packet_metadata_type |
| 0xF2 | Reserved for future use |
| 0xF3 | First packet containing metadata of a sequence with same packet_metadata_type, containing data that is identical to metadata of this type in the previous video frame |
| other | Reserved for future use |

Notably, the packet_id allows a device receiving the video stream to handle the metadata in a more efficient manner. Effectively the packet_id 0xF3 especially indicates that if this data was correctly received in the previous frame, then the current metadata may be ignored.

In particular as metadata for use in rendering may be frame accurate at one point and may be fixed for several other frames, this information can be particularly advantageous in implementing a more efficient metadata control handling.

packet_subcode indicates the frame packing configuration of the current frame according to the following table if the least significant bit of packet_id is set to 1 (i.e. packet_id is set to 0xF1 or 0F3). In all other cases packet_subcode is reserved for future use and set to 0.

TABLE 4 packet_subcode

| packet_subcode | Description | Note |
|---|---|---|
| 0x00 | Reserved for future use | This value shall be set in packets that are not the first packet of a sequence with same packet_metadata_type |
| 0x01 | Frame packing configuration is Mode A | Progressive 2D + depth |
| 0x02 | Frame packing configuration is Mode B | Interlaced 2D + depth |
| 0x03 | Frame packing configuration is Mode C | Progressive stereo + depth |
| 0x04 | Frame packing configuration is Mode D | Interlaced stereo + depth |
| Other | Reserved for future use | | packet_metadata_type identifies which type of metadata is included in the payload of this packet. Metadata type refers to the kind of supplemental information that may be originating from supplemental enhancement information (SEI) that was included in the coded bitstream, e.g. an AVC or HEVC bitstream, as standardized by ITU-T or ISO/IEC. Metadata type may also relate to a type of metadata that was generated by the source device.

packet_count indicates the number of packets following this packet with the same packet_metadata_type.

NOTE—The last packet contains a packet_count value of 0.

packet_payload( ) carries 56 bytes of the total packet payload byte stream included in the metadata channel.

The total packet payload byte stream for one frame is included in an uninterrupted stream of packets and contains for example the data sequence as presented in Table 5 (in case of 2 types of metadata):

TABLE 5 packet_payload_byte_stream data sequence

| | # bytes |
|---|---|
| packet_payload_byte_stream { for( i = 0; i < 3 ; i ++) { type_0_metadata( ) | p * 56 bytes |
| while (!56byte_aligned) { stuffing_byte } | |
| type_1_metadata( ) | q * 56 bytes |
| while (!56byte_aligned) { stuffing_byte } | |
| reserved_metadata_bytes( )    /* metadata_type > 1 */ | r * 56 bytes |
| while (!56byte_aligned) { stuffing_byte } } } | | stuffing_byte is set to 0x00. One or more stuffing bytes are included in the byte stream following the last metadata byte from the same type to fill up the packet payload towards the end (if needed). The relational expression in the preceding while statement is TRUE as long as the number of bytes in the packet payload byte stream is not a multiple of 56 bytes.

reserved_metadata_bytes( ) represents additional metadata that may be defined in future. Such additional data shall be included with increasing values of metadata_type and with possible inclusion of stuffing bytes (if needed to align the metadata with metadata channel packets).

packet_edc is a 4-byte field containing an error detection code computed over the first 60 bytes of the packet. This EDC uses the standard CRC-32 polynomial as defined in IEEE 802.3 and ITU-T V.42. The initial value and final XOR value are both 0.

Nature of the Metadata

The metadata as transferred via the video data signal is for use in depth map processing or rendering one or more views for further viewpoints by a multi-view rendering device. Such metadata is content dependent. The metadata is provided in accordance with the actual video data. Hence it may change in accordance with the actual video data, for example per field, per frame, per group of pictures, and/or per scene. Such metadata is inherently dynamic, and not static like a header which for example only indicates that image or depth data is present in a section of a two-dimensional matrix of video data. Optionally the metadata comprises at least one of metadata for encoding of a preferred rendering direction for image based rendering;

metadata indicative of the relation between the image and depth information;

metadata for use in remapping of the depth map or disparity map to a target display.

Various examples of such metadata are provided now.

The metadata for use in image based rendering may e.g. be metadata such as disclosed in WO2011039679, which relates to the encoding of a preferred rendering direction in a signal for image based rendering. This document discloses a method of encoding a video data signal comprising providing first image of a scene as seen from a first viewpoint, providing rendering information, such as a depth map, for enabling the generation of at least one rendered image of the scene as seen from a rendering viewpoint, and providing a preferred direction indicator, defining a preferred orientation of the rendering viewpoint relative to the first viewpoint, and generating the video data signal comprising encoded data representing the first image, the rendering information and the preferred direction indicator.

The preferred rendering direction information is metadata that is content dependent, but furthermore is metadata that needs to be used by the device that conducts the actual view rendering, which in case of an auto-stereoscopic display device would typically be the display device itself in order to allow the device manufacturer to manufacturer to create the best possible display device.

Alternatively the metadata may be indicative of the relation between the image and depth information such as disclosed in PCT application WO2010070545 (A1). Again the information encoded in the stream is dependent on the actual content and can be used by the auto-stereoscopic display device to further improve the rendering; e.g. in case of stereo+depth content it can be beneficial to know whether or not the depth information was derived from the stereoscopic content and/or whether the depth information result from human-assisted authoring. In the latter case, it may be more advantageous to do increase the resolution of a low-resolution depth map through image assisted upscaling using e.g. a cross-bilateral upscaling filter, rather than combining the low-resolution depth map with a higher resolution version based on disparity estimation of the stereoscopic content.

More alternatively the metadata provided may be metadata for use in remapping of the depth map or disparity map to a target display as e.g. disclosed in PCT application WO2010041176. This PCT application relates to the use of parallax transforms for retargeting content for different target displays.

Such depth/disparity remapping is a process that is not only content dependent but the processing of this data is moreover display device dependent. As a result this parallax transform data is data that is preferably provided in a compressed format together with the content itself. For example the parallax transforms may be embedded in the compressed content as read from a storage device, or data carrier or received from a wired/wireless network. And is subsequently added as metadata and transferred to the device responsible for view rendering.

Figure 3:
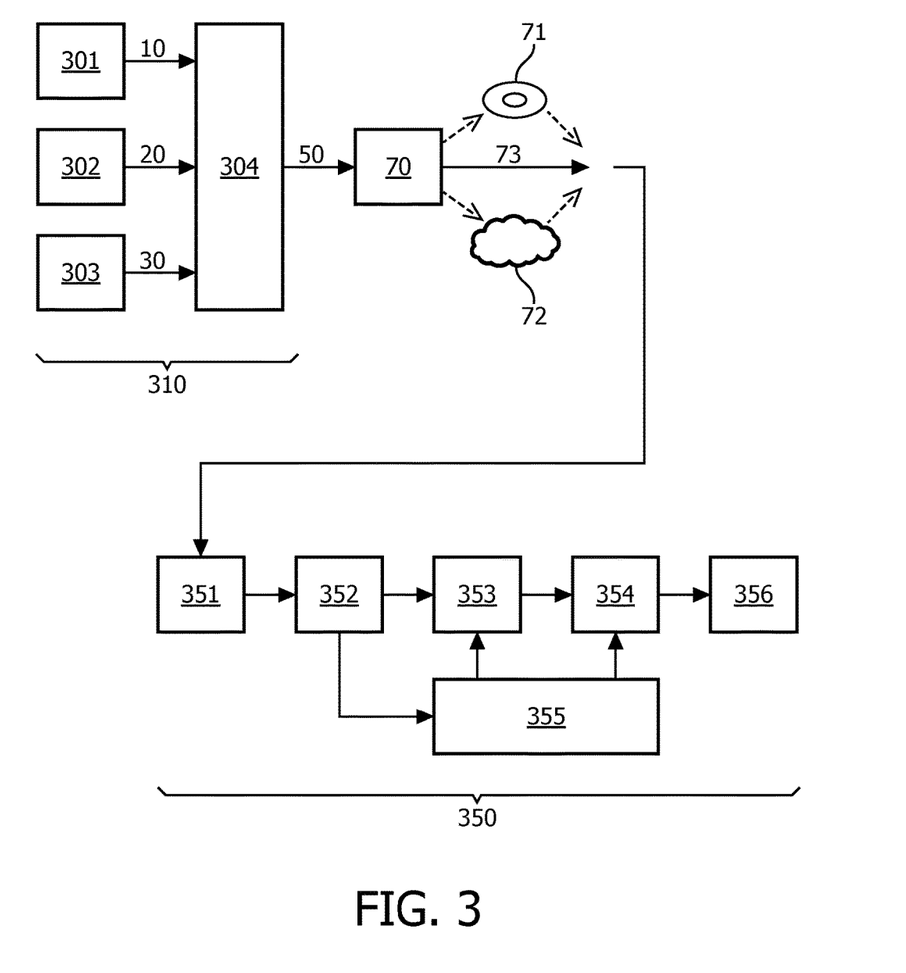
FIG. 3 shows a block diagram of an encoder according to the present invention and a decoder according to the present invention in a 3D rendering chain.

Referring to FIG. 3, FIG. 3 shows a block diagram of an encoder according to the present invention and a decoder according to the present invention in a 3D rendering chain.

On the top-left in the figure we can see the encoder 310. The encoder 310 is an encoder of a video data signal 50 for use with a multi-view rendering device. The encoder 310 comprises a first acquisition unit 301 arranged to acquire a first image 10 of a scene associated with a first viewpoint, a second acquisition unit 302 arranged to acquire a depth map 20 associated with the first image 10 and a third acquisition unit 303 arranged to acquire metadata 30 for use in depth map processing or rendering one or more views for further viewpoints by the multi-view rendering device. The encoder 310 further comprising a generator 304 arranged to generate a video data signal 50, the video data signal 50 comprising: one or two sub-images based on the first image 10, one or two further sub-images based on the depth map (20), and metadata (30) encoded in the one or two further sub-images.

Throughout this application the acquisition of data by an encoder is considered to include either receiving the data from an external source, acquiring the data by the encoder device or generating the data by the encoder device.

Preferably the information from the depth map 20 is encoded in the luminance values of the one or two further sub-images and the information from the metadata 30 is encoded in the chrominance values of the one or two further sub-images.

More preferably the information comprised in the video data signal comprises a substantially uncompressed two-dimensional array of data having placed therein the respective sub-images.

Once the video data signal 50 is encoded it can be handled by the handler 70, which could alternatively store the video data signal 50 on a storage medium 71, which could be a hard disk, optical disc or a non-volatile memory storage, such as a solid state memory. However in practice it is more likely that the data is transmitted by the handler 70 over a wired 72 or wireless network 73 or a combination of both (not shown).

The video data signal will subsequently arrive at decoder 350 for decoding a video data signal 50, the decoder comprising a receiver 351, arranged to receive the video data signal 50. At this stage the video data signal comprises a first image 10 of a scene associated with a first viewpoint, a depth map 20 associated with the first image 10 and metadata 30 for use in depth map processing or rendering multiple views. The video data signal is subsequently passed to a de-multiplexer 352, the de-multiplexer is arranged to de-multiplex the video data signal 50 so as to obtain access to the individual components.

The decoder 350 furthermore at least includes one of a depth map processor 353 arranged to process depth map 20 in dependence of metadata 30 or a rendering unit 354, the rendering unit arranged to rendering one or more views or both. At least one of them should be present in order for the present invention to be able to provide an advantage in the handling of the metadata.

More optionally the decoder 350 also includes a multi-view stereoscopic display unit 356. This display unit may be a barrier based or lenticular based multi-view display device, or another form of multi-view display device for which additional views need to be rendered.

After having de-multiplexed the data using the de-multiplexer 352, the metadata is passed to the control processor 355 for further handling of the metadata.

Figure 4:
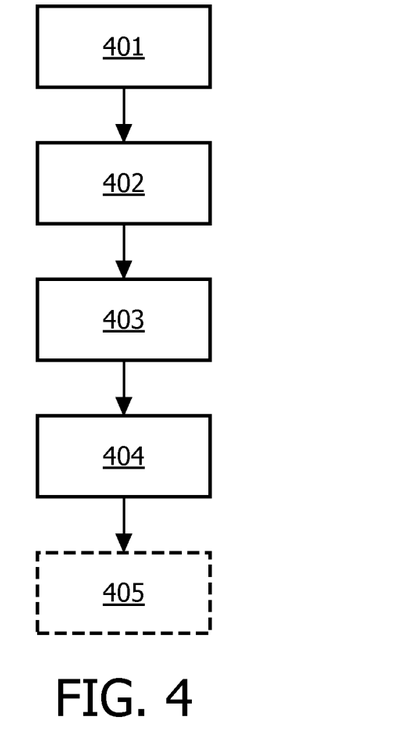
FIG. 4 shows a flow chart of a method of decoding according to the present invention.

Turning to FIG. 5, FIG. 4 shows a flow chart of a method of encoding according to the present invention. The flow chart depicts the process of encoding a video data signal 50 for use with a multi-view rendering device, the method comprises a step 401 of providing a first image 10 of a scene associated with a first viewpoint, a step 402 of providing a depth map 20 associated with the first image 10, and a step 403 of providing 403 metadata 30 for use in depth map processing or rendering one or more views for further viewpoints by a multi-view rendering device. The method further comprises a step 404 of generating 404 a video data signal 50, the video data signal 50 comprises one or two sub-images based on the first image 10, one or two further sub-images based on the depth map 20, and metadata 30 encoded in the one or two further sub-images.

As indicated hereinabove preferably the information from the depth map 20 is encoded in the luminance values of the one or two further sub-images and the information from the metadata 30 is encoded in the chrominance values of the one or two further sub-images.

More preferably the information comprised in the video data signal comprises a substantially uncompressed two-dimensional array of data having placed therein the respective sub-images.

Figure 5A:
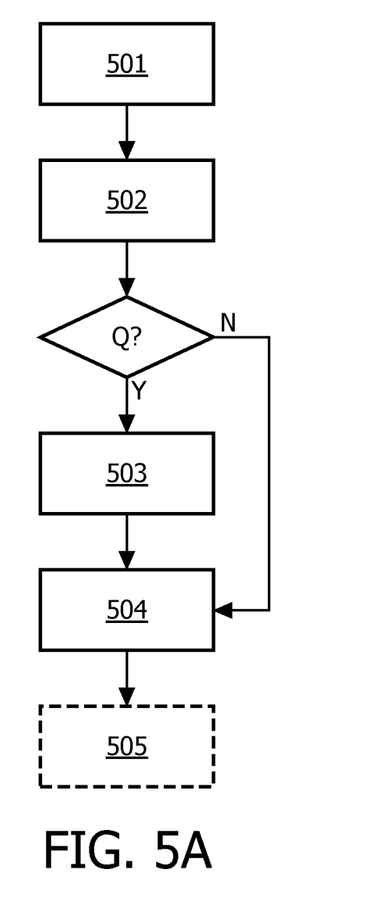
FIG. 5A shows a flow chart of a method of encoding according to the present invention.

Turning to FIG. 5, FIG. 5 shows a flow chart of a method of decoding according to the present invention. The flow chart schematically shows the process of decoding a video data signal 50, the method comprises a step 501 for receiving the video data signal 50. The video data signal comprises a first image 10 of a scene associated with a first viewpoint, a depth map 20 associated with the first image 10, and metadata 30 for use in either depth map processing or rendering multiple views as described herein above with reference to FIG. 3.

The method further comprises a step 502 of de-multiplexing 502 the video data signal 50 so as to obtain access to the individual components. Following the de-multiplexing the metadata is inspect in order to determine how further processing should proceed. In case there is a need for depth map processing in dependence of metadata 30, the process continues with step 503; i.e. depth map processing 503 of depth map 20 in dependence of metadata 30.

Alternatively when no depth map processing is required; the process continues at step 504 with rendering (504) one or more views for further viewpoints in dependence of metadata (30). Finally optionally the newly rendered views used in step 505 of actually displaying the rendered views using a multi-view stereoscopic display device.

Figure 5B:
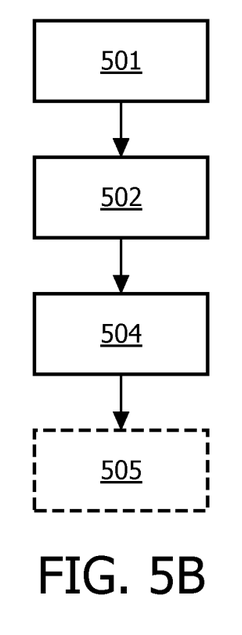
FIG. 5B shows a flow chart of an alternative method of encoding according to the present invention.
Figure 5C:
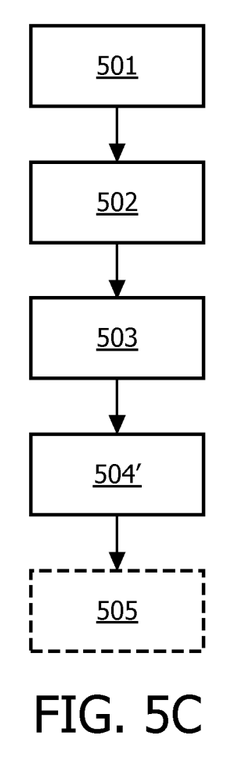
FIG. 5C shows a flow chart of a more alternative method of encoding according to the present invention.

Notably FIGS. 5B and 5C provide further embodiments of a method of decoding according to the present invention, wherein FIG. 5B shows an embodiment wherein there is no metadata provided for depth processing; i.e. a scenario wherein the metadata is used only for controlling the rendering process. As there is no depth processing based on metadata this step was eliminated from the flow chart.

Likewise FIG. 5C shows an embodiment wherein there is no metadata provided for the rendering process but where there always is metadata provided for the depth processing step. In this scenario the step 504 which involved view rendering in dependence of metadata 30, is replaced by step 504', which is a view rendering step that does not use the metadata 30.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines.

Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically.

Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of encoding a video data signal for use in a multi-view rendering device, the method comprising:
   providing a first image of a scene, wherein the scene is associated with a first viewpoint;
   providing a depth map associated with the first image;
   providing metadata, wherein the metadata is arranged for depth map processing;
   generating the video data signal, the video data signal comprising video frames partitioned into sub-images, the sub-images comprising:
   a first sub-image based on the first image; and
   a first depth sub-image based on the depth map.

2. The method of encoding according to claim 1, wherein the metadata for rendering one or more views for further viewpoints.

3. The method of encoding according to claim 1, wherein the metadata is encoded in a color component of the first depth sub-image.

4. The method of encoding according to claim 1, wherein the metadata comprises change information indicating whether the metadata has changed since the previous frame.

5. The method of encoding according to claim 1, wherein the video data signal is arranged in luminance and chrominance values, and the depth map is encoded in the luminance values of the first depth sub-image and the metadata is encoded in the chrominance values of the first depth sub-image.

6. The method of encoding according to claim 1, wherein the video data signal is arranged in R, G and B components, and the depth map is encoded in a first component of the R, G and B components of the first depth sub-image and the metadata is encoded in a further component of the R, G and B components of the first depth sub-image.

7. The method of encoding according to claim 1, wherein the metadata is inserted in the video data signal for every field, and/or for every frame, and/or for every group of pictures, and/or for every scene.

8. The method of encoding according to claim 1 the method further comprising:
   providing a second image of a scene associated with a second viewpoint; and
   providing a second depth map associated with the second image,
   wherein generating the video data signal comprises including a second sub-image based on the second image,
   wherein generating the video data signal comprises including a second depth sub-image based on the second depth map.

9. A method of decoding a video data signal, the method comprising:
   receiving the video data signal, the video data signal comprising:
   a first image of a scene, wherein the scene is associated with a first viewpoint;

a depth map associated with the first image;
a metadata, wherein the metadata is arranged for depth map processing;
frames partitioned in sub-images, the sub-images comprising:
a first sub-image based on the first image; and
a first depth sub-image based on the depth map.

10. The method of decoding a video data signal according to claim 9, wherein the metadata is arranged for rendering multiple views.

11. The method of decoding a video data signal according to claim 9, wherein the metadata is encoded in the first depth sub-image.

12. The method of decoding a video data signal according to claim 9, further comprising de-multiplexing the video data signal so as to obtain access to the individual components and to retrieve the metadata from a color component of the first depth sub-image.

13. The method of decoding a video data signal according to claim 9, wherein the metadata is repeatedly inserted in subsequent video frames.

14. The method of decoding a video data signal according to claim 9, further comprising depth map processing of the depth map in dependence of the metadata.

15. The method of decoding a video data signal according to claim 9, further comprising rendering one or more views for further viewpoints in dependence of the metadata.

16. The method of decoding a video data signal according to claim 9, further comprising controlling a process for handling the metadata processing and for using change information in order to determine whether to process the metadata further.

17. A decoder circuit, the decoder circuit comprising:
a receiver circuit, the receiver circuit arranged to receive the video data signal, the video data signal comprising:
a first image of a scene associated with a first viewpoint;
a depth map associated with the first image; and
a metadata wherein the metadata is arranged for depth map processing,
wherein the video data signal comprises video frames partitioned in sub-images, the sub-images comprising:
a first sub-image based on the first image; and
a first depth sub-image based on the depth map.

18. The decoder circuit according to claim 17, wherein the metadata encoded in the first depth sub-image.

19. The decoder circuit according to claim 17, further comprising a de-multiplexer circuit, wherein the de-multiplexer circuit is arranged to de-multiplex the video data signal so as to retrieve the metadata from a color component of the first depth sub-image.

20. The decoder circuit according to claim 17, wherein the metadata is repeatedly inserted in subsequent video frames, whether or not there was a change in the metadata.

21. The decoder circuit according to claim 17, wherein the metadata is comprises information indicating whether the metadata has changed since the previous frame.

22. The decoder circuit according to claim 17, further comprising a depth map processor circuit, wherein the depth map processor circuit is arranged to process the depth map in dependence of the metadata.

23. The decoder circuit according to claim 17, further comprising a rendering circuit, wherein the rendering circuit is arranged to render one or more views in dependence of the metadata.

24. The decoder circuit according to claim 17, further comprising a depth map processor circuit, wherein the depth map processor circuit is arranged to process the depth map in dependence of the metadata.

25. The decoder circuit according to claim 17, further comprising a control processor circuit, wherein the control processor circuit is arrange to use the change information in order to determine whether to process the metadata further in dependence of the change information.

26. A decoder circuit according to claim 17, the decoder circuit further comprising a multi-view stereoscopic display unit, for displaying the rendered one or more views.

* * * * *